United States Patent [19]

Hehl

[11] Patent Number: 5,439,367

[45] Date of Patent: Aug. 8, 1995

[54] PLASTIC MATERIAL CHANGING UNIT IN AN INJECTION MOLDING MACHINE

[76] Inventor: Karl Hehl, Arthur-Hehl-Str. 32, D-7298 Lossburg 1, Germany

[21] Appl. No.: 286,788

[22] Filed: Aug. 5, 1994

Related U.S. Application Data

[63] Continuation of Ser. No. 59,599, May 12, 1993, abandoned.

[30] Foreign Application Priority Data

May 16, 1992 [DE] Germany .................. 42 16 312.9

[51] Int. Cl.$^6$ ........................................... B29C 45/23
[52] U.S. Cl. .................................. 425/183; 425/190; 425/192 R
[58] Field of Search ............... 425/182, 190, 192 R

[56] References Cited

U.S. PATENT DOCUMENTS

| | | | |
|---|---|---|---|
| 3,980,208 | 9/1976 | Hehl | 222/193 |
| 4,418,845 | 12/1983 | Hehl | 222/162 |
| 4,731,005 | 3/1988 | Hehl | 425/185 |
| 4,753,589 | 6/1988 | Hehl | 455/186 |
| 4,889,479 | 12/1989 | Hehl | 425/185 |
| 5,022,847 | 6/1991 | Hehl | 425/578 |

FOREIGN PATENT DOCUMENTS

| | | |
|---|---|---|
| 0471895 | 2/1992 | European Pat. Off. . |
| 60-112416 | 6/1985 | Japan . |
| 1369744 | 10/1974 | United Kingdom . |
| 2112506 | 7/1983 | United Kingdom . |

*Primary Examiner*—Tim Heitbrink
*Attorney, Agent, or Firm*—Spencer, Frank & Schneider

[57] ABSTRACT

An injection molding unit for processing synthetic materials has a changing unit provided with several connecting bores, transversally lockable separately controllable stoppers, for optional connection to supply lines. The stationary connecting bores are arranged at a basic body radially around a central feed opening, which is at least partially bordered by the stoppers when they are out of operation. Consequently the necessary space requirement as well as the effort for running in the stoppers can be reduced.

14 Claims, 5 Drawing Sheets

1

PLASTIC MATERIAL CHANGING UNIT IN AN INJECTION MOLDING MACHINE

This application is a continuation of application Ser. No. 08/059,599, filed May 12, 1993 now abandoned.

BACKGROUND OF THE INVENTION

1. Field of the Invention

This invention relates to an injection molding unit for processing synthetic materials, comprising a changing device being supplied with synthetic materials and a plurality of connecting bores. The connecting bores are transversally lockable by means of separately triggerable stoppers, for optional connection of supply lines, from which material stored in tanks of the inflection molding unit is supplied via a feed opening.

2. Description of the Prior Art

U.S. Pat. No. 4,731,005 discloses a unit of this type with a changing device in which several supply lines are disposed side by side on a guide rail that extends transversally with respect to an injection axis. These supply lines serve to optionally supply the injection molding unit either with synthetic material or with cleaning material. The individual supply lines are carried by a sliding plate and alternately conform with the feed opening of the carrier block by means of a ball rolling spindle, which engages in mentioned sliding plate. Due to the fact that the stoppers are brought in line with a coupling element during the transversal displacement, as a result, they are triggerable perpendicularly with respect to a drop hole, which is arranged in the carrier block. Due to the transversal displacement of the supply lines, necessary for the feeding of material, and the vertical displacement of the stoppers effected for it, however, a large space over the machine has to be kept free for the supply units and is even increased by the flexible feed lines required.

A further changing device comparable with the aforementioned changing device is known from U.S. Pat. No. 4,889.479. In this device the transversal displacement of the supply lines is managed by interconnected hydraulic cylinders, simplifying achievement of the final and intermediate positions. Separate hydraulic facilities arranged in the area of the changing device are also known from U.S. Pat. No. 5,022,847.

Another possibility to supply synthetic material via supply lines is, for example, to effect the transport by an airflow by means of a dosification appliance, as for instance is known from U.S. Pat. No. 3,980,208. However, it is also possible to arrange different supply tanks radially around the feed shaft, as for example is known from U.S. Pat. No. 4,418,845.

SUMMARY OF THE INVENTION

In view of the prior art discussed hereinbefore it is an object of the invention to provide an injection molding unit with a changing device of the kind described first hereinbefore, in which several connections for different materials can be arranged together in a space-saving way, whereby at the same time the space requirement for locking the individual supply lines is reduced to a minimum.

That object is accomplished in accordance with the invention in that the connecting bores at a basic body of the changing device that are radially arranged around a feed opening are, according to first and second operating positions of the stoppers, at least partially bordered by them.

In such an arrangement no movable parts are perceptible outside the changing device. The changing device rather always remains in a fixed condition, calculable as to its space requirement. The stoppers are placed inside the changing device and thus also potential clamping points can be securely avoided. The arrangement of the stoppers around a central feed opening creates the constructional prerequisites for a simple and space-saving stopper control system, while the radial arrangement of the connecting bores simplifies considerably the connection of the individual supply lines, since this process now can be effected in an area in that the injection molding unit basically does not represent an obstacle.

According to a preferred feature the vertically disposed stoppers are arranged concentrically around and parallel to the axis, which constitutes the center line of the feed opening. The feed opening is designed as a collecting shaft of a basic body, whereby the feed opening of the basic body is congruent with the central feed opening of the carrier block. The supply lines, which are designed as feed hoses, are connected to several feed shafts by means of connecting bores that include an angle to the axis of the collecting shaft. The feed shafts as well as the changing device itself are disposed symmetrically with respect to a vertical plane that extends through the injection axis. From such an arrangement follows that the whole injection molding unit is loaded centrically and at the same time symmetrically, which is of essential importance for a cyclical working machine.

According to a preferred feature the collecting shaft is closed at its top by a conical insert piece, which can be inset in the basic body and which is provided with several guiding devices for the stoppers an its periphery. In such an arrangement the whole stopper mechanism is easily detachable from the injection molding unit without requiring additional disassemblies and rebuiidings. This offers the advantage that the maintenance is essentially made easier.

According to a the preferred feature the conical insert piece shows on its upper surface a plurality of stay bolts, which on the one hand bear the carrier plate and on the other hand guide a further movable carrier plate that is coupleable with one or several of the stoppers. The movable carrier plate is connected with a nut, which cooperates with a spindle that is placed in the conical insert piece and is set to rotation by a motor disposed on the carrier plate that is designed as a motor carrier plate in this case. In such an arrangement the whole stopper mechanism is operated merely electrically, so that no separate hydraulic devices have to be provided. Rather the whole control-technical part can be accomodated inside the protective housing. Toward this end different working plates are provided in the housing, which have both bearing and supporting function for the stoppers.

According to a preferred feature, each of the stoppers is associated to each a magnet, which are arranged radially around the movable carrier plate, whereby the magnet engages a stud, in case of need, that can be run into a control opening of the stoppers. In such an arrangement individual or several stoppers can be pulled at the same time specifically, so that it is possible to mix different materials without problems. Should disturbances arise in one of the material shafts, the working process must not be interrupted, since one of the other material shafts can be used unproblematically for continuation of the material supply. Consequently, downtimes are reduced. In this case the magnets are connected in such a way that without current the stoppers are not coupled.

According to a preferred feature, the conical insert piece is provided with a limit stop switch for closed position indication of the stoppers, whereas the motor carrier plate is provided with limit stop switches for opened condition indication of the stoppers. In such an arrangement the position of the stoppers is additionally realized, however, this can also be ensured by corresponding limit stops at the carrier plate. Basically there exists also the possibility to realize the nominal angle position of the thread spindle, however, this would involve a higher control-technical effort.

PREFERRED EMBODIMENT OF THE DRAWING

An illustrative embodiment of the invention will now be described with reference to the drawings, and further advantages afforded by the invention will become apparent from said description.

Figure 1:
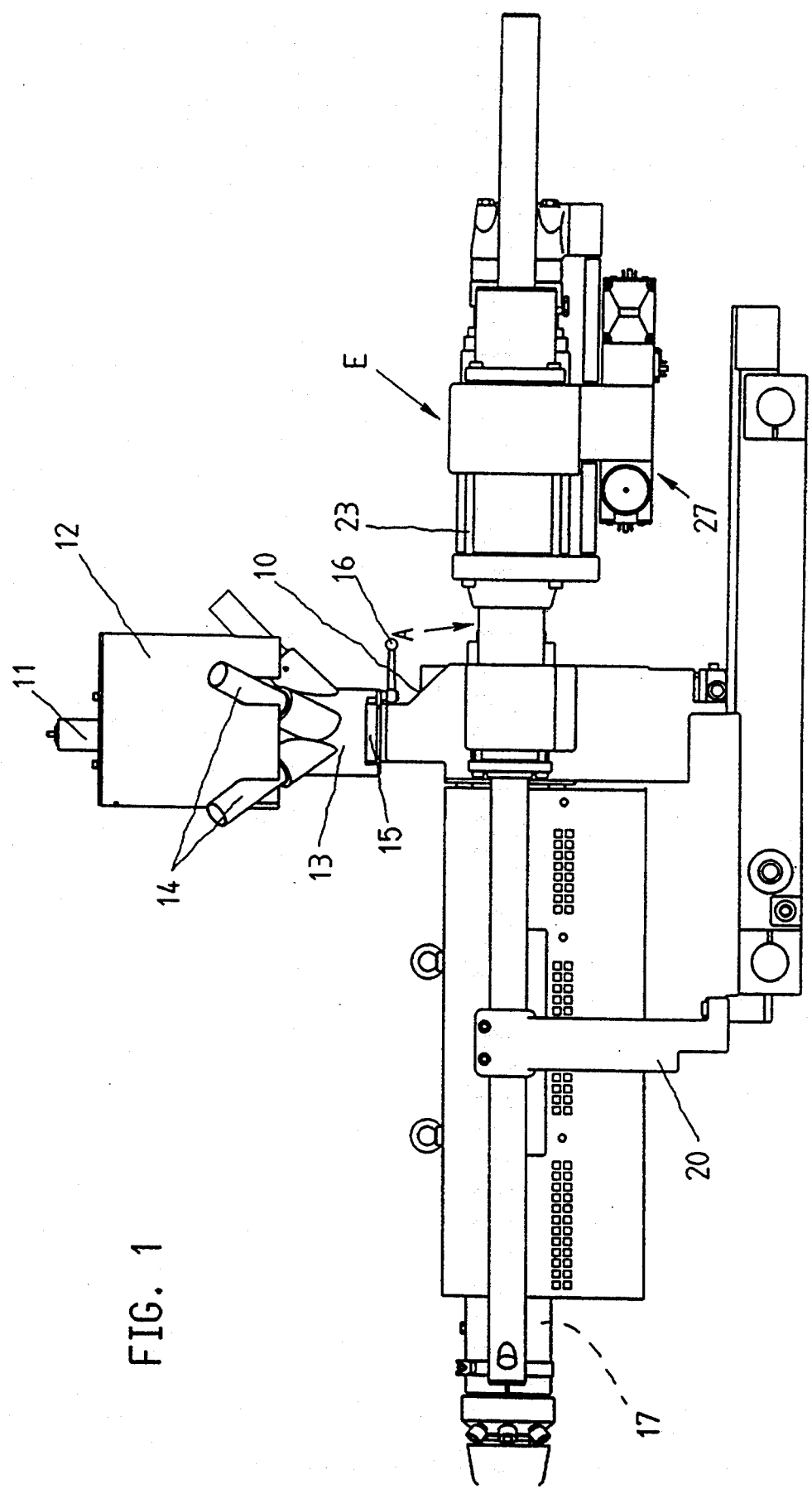
FIG. 1 is a side view of an injection molding unit provided with a changing device for synthetic materials.

As shown in FIG. 1 the changing device is arranged at the carrier block of an injection molding unit of an injection molding machine for processing synthetic materials. The injection molding unit is supported by the machine pedestal of the injection molding machine through a carrier element 20. In this unit the plasticizing cylinder 17 is held in a carrying skeleton by means of skeleton members. The drive cylinders A move the injection molding unit and, besides, the injection cylinders E make possible a movement of the feed screw disposed in the plasticizing cylinder. The drive cylinders A and the injection cylinders E, which are hydraulically controlled by hydraulic valves 27, are held in a carrier block 10, that at the same time serves to supply synthetic material to the plasticizing cylinder. For this purpose the carrier block is provided with a feed opening 10a, to which a changing device for synthetic materials can be connected. Moreover the carrier block 10 holds at its backside the plasticizing cylinder 17 and can release it through a release lift, so that it can be exchanged afterwards.

Figure 2:
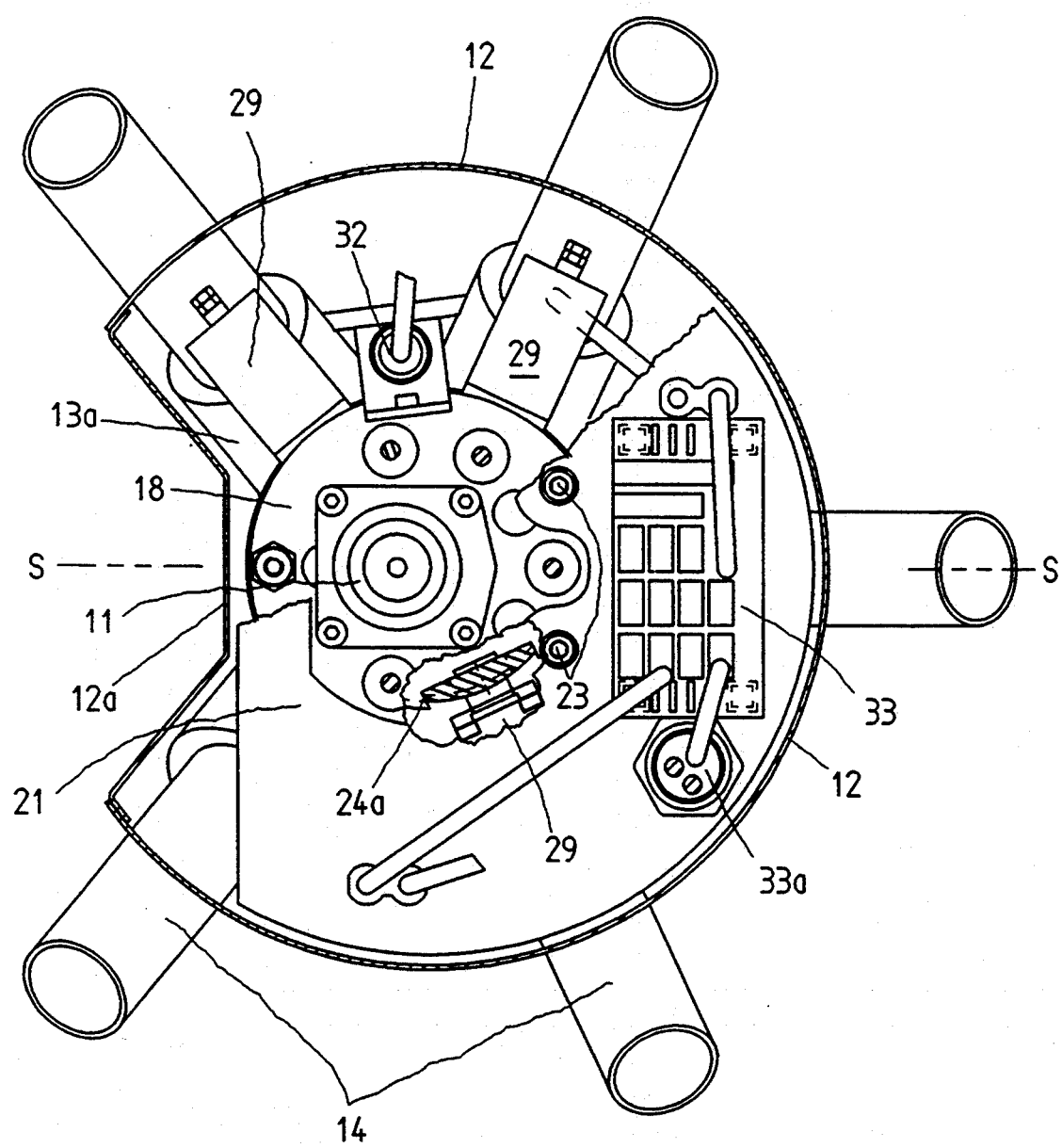
FIG. 2 is a top plan view showing the changing device for synthetic materials at a horizontal section through the protective housing, whereby the intermediate plate and the motor carrier plate are partially cutted.

The changing device is equipped with several connecting bores 13c, which are transversally lockable by means of separately controllable stoppers 30, for optional connection of supply lines, which in this embodiment are designed as feed hoses. Instead of these hoses, stationary supply tanks might be used as well. The synthetic material or the cleaning material is fed to the injection molding unit via the supply lines. However, the changing device is, of course, suitable for the supply of other materials as well, as for example pulverized materials for ceramic-injection molding. The connecting bores are arranged stationary at a basic body of the changing device, which is detachably mounted on the carrier block. The connecting bores 13c are arranged radially around a central feed opening 10a of the carrier block. In non-operated condition the stoppers 30 at least partially border the feed opening. This means, as can be seen from FIGS. 3 and 4, that the vertical projection of the stoppers "forms a frame around" the feed opening. The stoppers 30 are arranged concentrically around and parallel to an axis a-a of the feed opening. The feed opening is being a collecting shaft 13b of the basic body 13, whereby the feed opening of that basic body is congruent with the central feed opening 10a of the carrier block. The connecting bores are placed transverse with respect to the axis of the feed shafts 13a of the basic body 13, which feed shafts include an angle α to the axis a-a of the collecting shaft 13b. The changing device for synthetic materials, as well as the feed hoses 14, are disposed symmetrically with respect to a vertical plane of the injection molding unit that extends through the injection axis s-s (FIG. 2).

Figure 3:
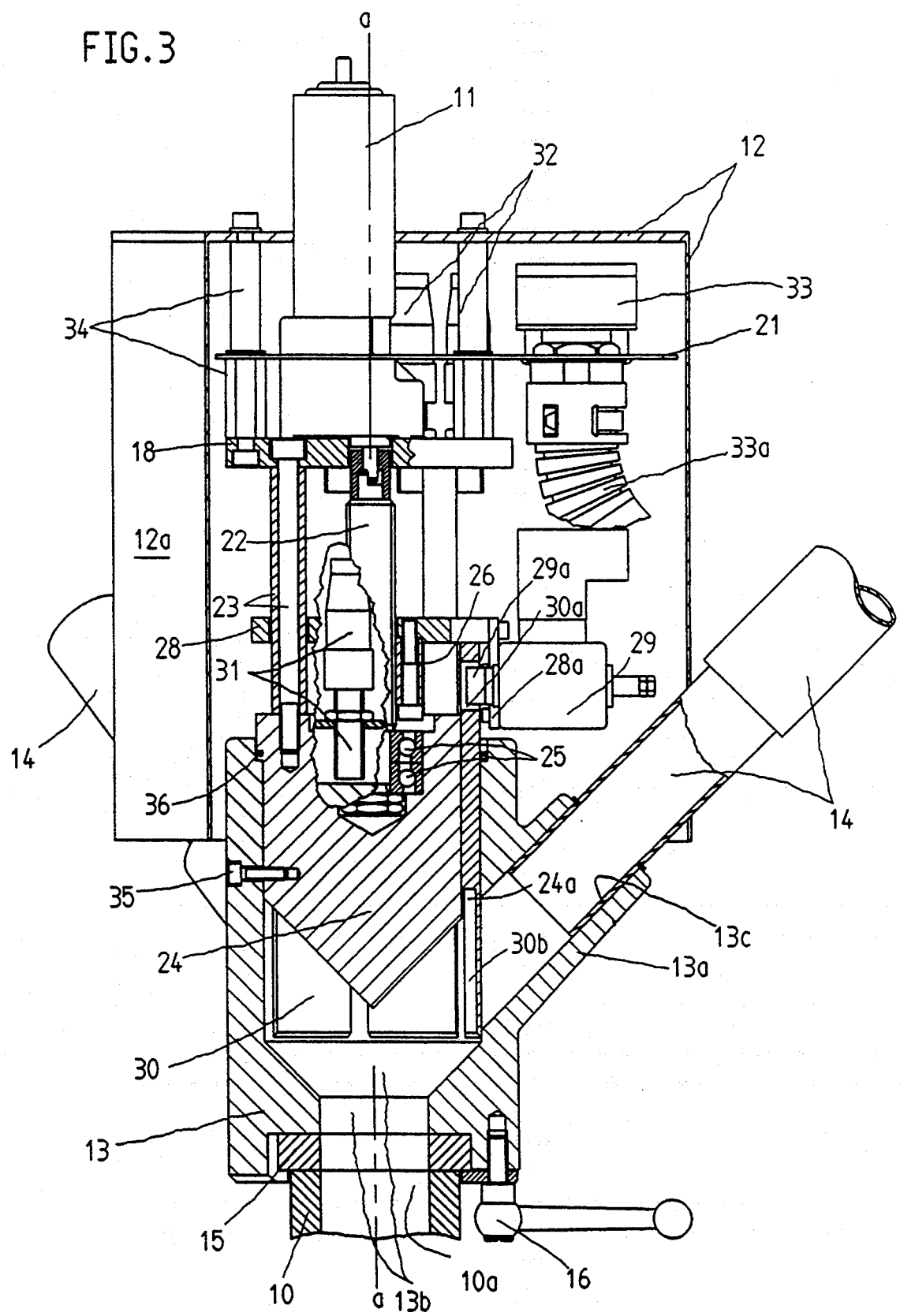
FIG. 3 is a vertical section through the plane of symmetry of the changing device with a completely closed stopper.
Figure 4:
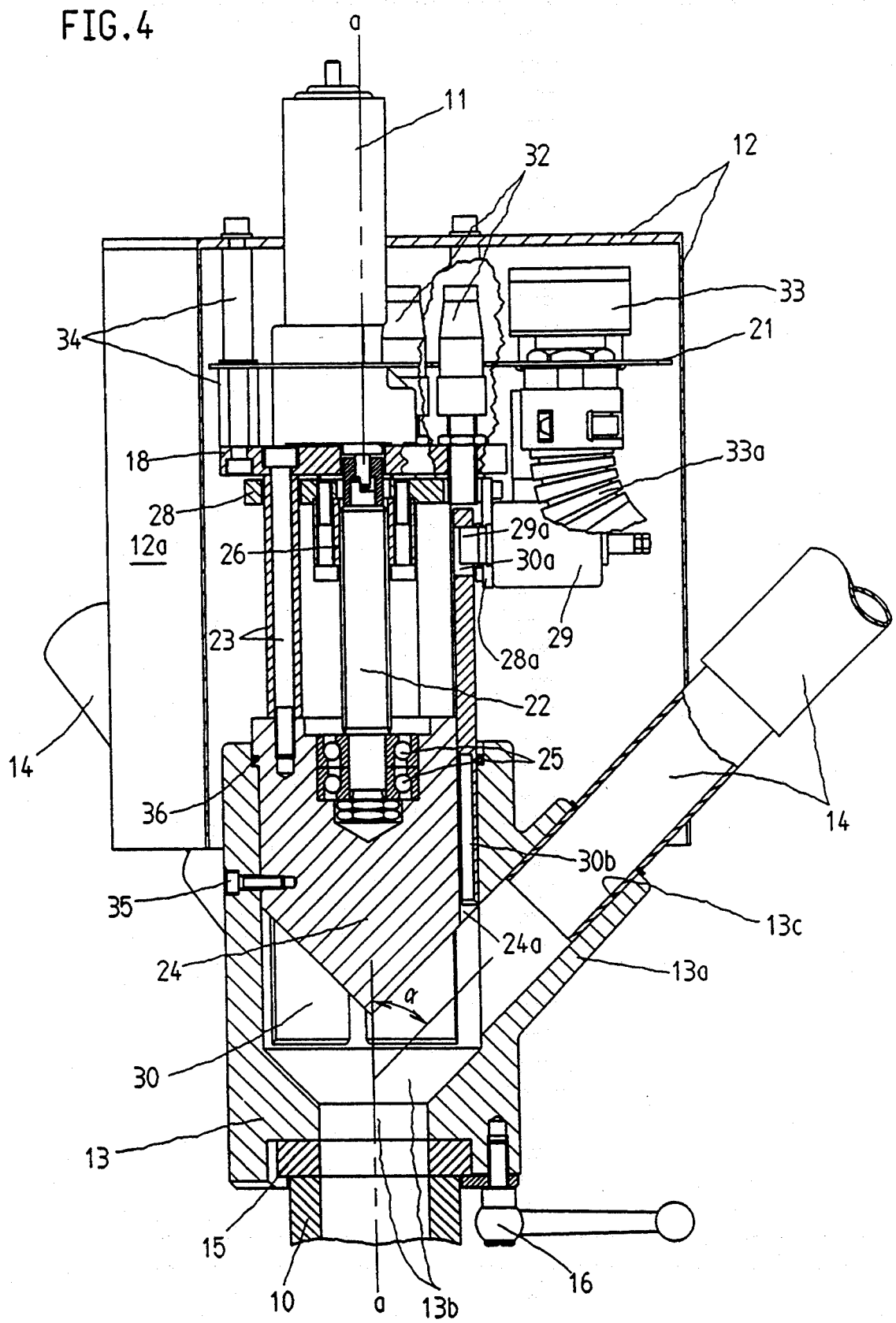
FIG. 4 is a vertical section through the plane of symmetry of the changing device with a completely opened stopper.

As FIG. 3 reveals, a conical insert piece 24 is inset in a centrical opening of the basic body and is fixed there by connecting studs 35. This conical insert piece is arranged at the top of the collecting shaft 13b and at the same time serves as a guiding for the material that is supplied through the feed shaft 13a. The conical insert piece is provided with guidings 24a for the stoppers 30 at its periphery and can be detached from the changing device as constructional unit together with the stoppers, a spindle drive consisting of a spindle 22 and a nut 26, and the movable carrier plate 28. As a result, the easy maintenance of the changing device is increased. The conical insert piece 24 has stay studs 23 on its upper surface, which on the one hand bear the motor carrier plate 18 and on the other hand guide the movable carrier plate 28. The movable carrier plate 28 again is connected with the nut 26—it could be, of course, formed intergrally, too—which cooperates with a spindle 22, that is set to rotation by a motor 11. The spindle 22 is run on bearings 25 in the conical insert piece 24. The movable carrier plate accomodated in the protective housing moves up and down by rotation of the spindle. The movable carrier plate 28 is provided with individually controllable magnets 29 at its perimeter, which move a stud 29a by electric induction. When the magnet 29 is switched, the stud 29a can be run into a control opening 30a of the stoppers 30. For this purpose a magnet 29 is associated to each of the stoppers 30. As can be seen from the FIGS. 3 and 4, the magnets 29 are arranged radially around a movable carrier plate 28, so that it is possible to effect a radial transfer towards inside into a coupling position, when the stud 29a is engaged by the magnet. Depending on which magnets 29 are controlled simultaneously, it is also possible to couple one or several stoppers at the same time. Of course, because the stoppers can be selectively controlled, it is apparent that the connecting bores likewise can be selected in any combination or sequence, depending on the operating position of the respective stoppers.

Figure 5:
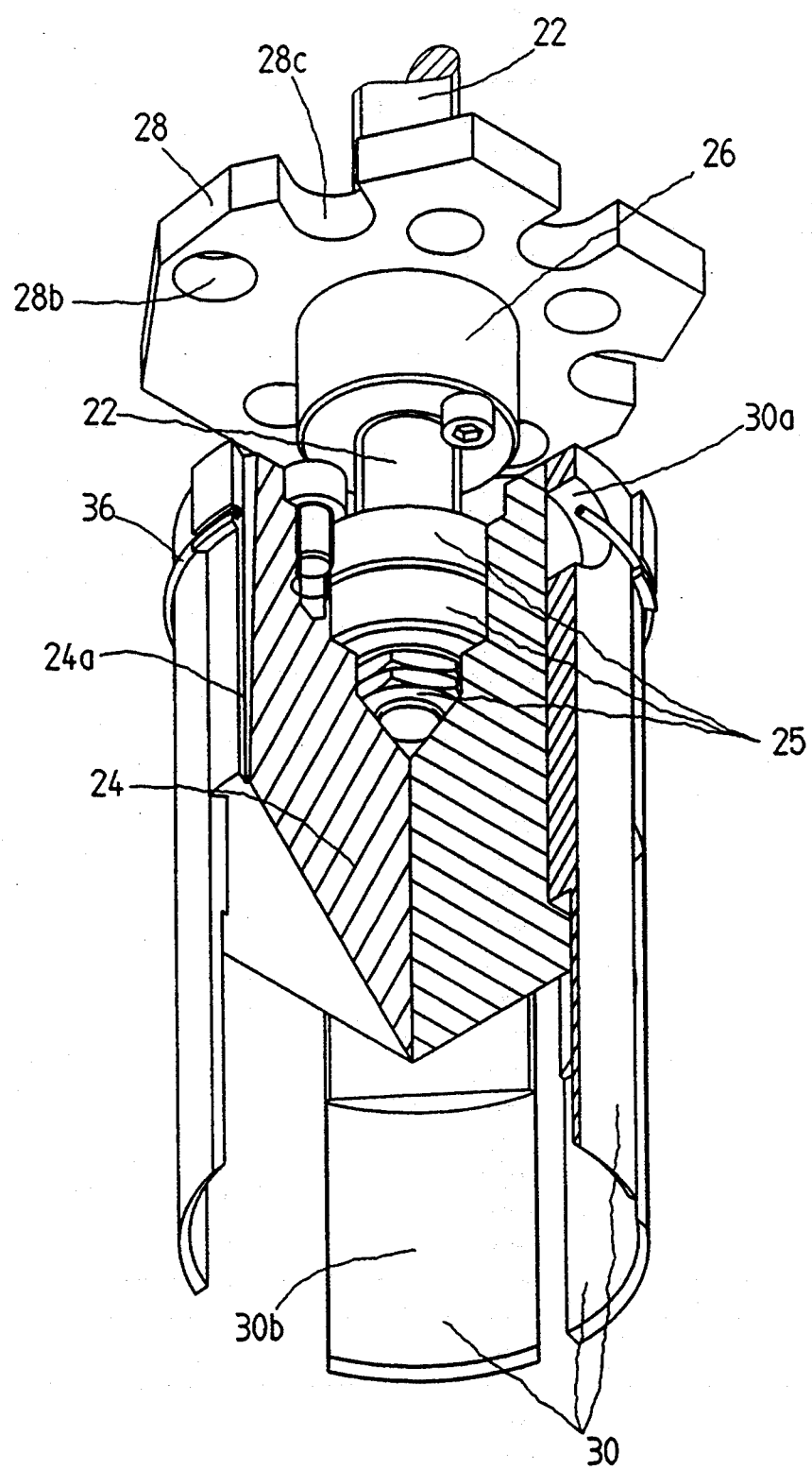
FIG. 5 is a partial sectional three dimensional projection of the conical insert piece including stoppers and movable carrier plate.

When the conical insert piece 24 is disassembled, the stoppers 30 are fixed by a mounting ring 36 at the conical insert piece, as shown in FIG. 5. The movable carrier plate has bores, which serve as guiding 28b and in assembled condition are penetrated by the stay studs 23. Besides, in the area of the perimeter of the movable carrier plate openings 28c are provided, which are penetrated by limit stop switches 32, that control the open position of the individual stoppers 30. In FIG. 3, only limit stop switch 31, which indicates the closed condition of the stoppers 30, is represented.

A further intermediate plate 21 is supported on the motor carrier plate 18 by studs 34. This plate is used in particular to bear the distribution plate 33, which is connected with the control of the injection molding machine by a connecting line 33a and is arranged in such a way on the distribution plate, that is contained inside the protective housing 12.

As is apparent from FIG. 2, the protective housing has an indentation 12a, which in particular is provided for making possible a change of the "nude" plasticizing cylinder 17, as is for example known from U.S. Pat. No. 4,753,589. Furthermore this figure reveals that the cross-sectional shape of the stoppers basically is a segment of a circle. In the actual stopping area 30b, however, the cross-section is minimized to an arc of a circle, as is apparent from FIG. 3. This shape allows a safe and quick locking of the feed opening 13a, since it facilitates a faster penetration into the material ready for processing. Since the locking process is effected in a transversal direction and thus the grains can evade being crushed, there occurs fewer interruptions, caused as a result of disturbing granulated material, than in those devices, where the stoppers lock the feed shaft perpendicularly.

The whole changing device can be detached from the carrier block 10. To this end the basic body clips a guide bead 15 at the head of the carrier block 10. In connected position the changing unit is fixable by a locking element 16. The magnets 29 are held by fixings 28a in the movable carrier plate 28.

I claim:

1. In an injection molding unit for processing synthetic materials having a changing unit to supply said injection molding unit with synthetic material, the injection molding unit further comprising:
    a carrier block provided with a central feed opening,
    a basic body of said changing unit detachably mounted on said carrier block and also provided with a feed opening,
    a plurality of connecting bores, which are transversely lockable and are arranged at said central feed opening in said basic body,
    a plurality of supply lines, which are optionally connectable to said connecting bores and by which material stored in tanks of said injection molding unit is supplied via said central feed opening and said basic body feed opening,
    a plurality of stoppers, which can be separately triggered and each of which is cooperating with one of said connecting bores to stop supply of said synthetic material in a first operating position or to allow supply of said synthetic material in a second operating position to said injection molding unit,
    the improvement residing in that
    said connecting bores are arranged radially around said central feed opening and at least partially bordered by said stoppers, whereby the connecting bores are selectable in any combination and sequence according to said first or second operating position of said stoppers.

2. The injection molding unit set forth in claim 1, wherein
    said stoppers are vertically disposed and arranged concentrically around and parallel to an axis,
    said axis being a center line of said feed opening, said feed opening being a collecting shaft of said basic body, whereby said feed opening of said basic body is congruent with said central feed opening of said carrier block.

3. The injection molding unit set forth in claim 2, wherein
    said supply lines are feed hoses and are connected to several feed shafts via said connecting bores, which feed shafts include an angle to said axis of said collecting shaft and
    said feed shafts as well as said changing unit are disposed symmetrically with respect to a vertical plane extending through an injection axis of said injection molding unit.

4. The injection molding unit set forth in claim 2, wherein
    at a top of said collecting shaft a conical insert piece is arranged, said insert piece being provided at a periphery thereof with several guiding devices for said stoppers.

5. The injection molding unit set forth in claim 4, wherein
    said conical insert piece having on an upper surface thereof a plurality of stay bolts which bear a motor carrier plate and guide a further movable carrier plate that is coupleable with one or several of said stoppers.

6. The injection molding unit set forth in claim 4, wherein
    said conical insert piece is provided with a limit stop switch for closed position indication of said stoppers.

7. The injection molding unit set forth in claim 5, wherein
    said movable carrier plate is connected with a nut, said nut cooperates with a spindle that is placed in said conical insert piece and is set to rotation by a motor disposed on said carrier plate, wherein said carrier plate is a motor carrier plane.

8. The injection molding unit set forth in claim 5, wherein
    each of said stoppers is associated with a magnet, said magnets being arranged radially around said movable carrier plate, whereby each said magnet engages a stud that can be positioned into a control opening of said stoppers.

9. The injection molding unit set forth in claim 7, wherein
    said motor carrier plate bears studs, whereby said studs support a protective housing and an intermediate plate which contains additional supply elements.

10. The injection molding unit set forth in claim 7, wherein
    said motor carrier plate is provided with limit stop switches associated with each of said stoppers.

11. The injection molding unit set forth in claim 1, wherein
    said stoppers together form a circle and each stopper being minimized to an arc of said circle when viewed in cross section.

12. The injection molding unit set forth in claim 1, wherein said carrier block is provided with a guide bead which engages said basic body and a locking element for interlocking said changing unit with said carrier block.

13. The injection molding unit set forth in claim 5, wherein said conical insert piece together with said stoppers, a spindle drive comprising a spindle and a nut and said movable carrier plate, are detachable as one constructional unit.

14. An injection molding machine comprising
  (a) an injection molding unit for processing synthetic materials;
  (b) a carrier block provided with a central feed opening; and
  (c) a changing unit to supply said injection molding unit with synthetic material, the changing unit including:
    (1) a basic body detachably mounted on said carrier block and having a feed opening;
    (2) a plurality of transversely lockable connecting bores radially arranged at said feed opening of said basic body;
    (3) a plurality of supply lines connectable to said connecting bores for supplying material stored in tanks of said injection molding unit via said central feed opening of said carrier block and feed opening of said basic body; and
    (4) means for simultaneously selecting a plurality of said connecting bores to provide for a simultaneous supply of said synthetic material to said injection molding unit; said means comprising a plurality of separately triggerable stoppers, each stopper having a first and a second operating position; each said stopper cooperating with one of said connecting bores to stop the supply of said synthetic material in the first operating position or to allow the supply of said synthetic material to said injection molding unit in the second operating position; said connecting bores being at least partially bordered by said stoppers.

* * * * *